US010662648B2

United States Patent
Faynot et al.

(10) Patent No.: US 10,662,648 B2
(45) Date of Patent: May 26, 2020

(54) GYPSUM BOARD SUITABLE FOR WET OR HUMID AREAS

(71) Applicant: Ahlstrom-Munksjö Oyj, Helsinki (FI)

(72) Inventors: Emmanuel Faynot, Vif (FR); Marc Berlioz, Froges (FR); Samuel Merlet, Route de la Gorge (FR); Claude Leclercq, Pernes les Fontaines (FR)

(73) Assignee: Ahlstrom-Munksjö Oyj, Helsinki (FI)

( * ) Notice: Subject to any disclaimer, the term of this patent is extended or adjusted under 35 U.S.C. 154(b) by 714 days.

(21) Appl. No.: 14/373,826

(22) PCT Filed: Dec. 26, 2012

(86) PCT No.: PCT/EP2012/076905
§ 371 (c)(1),
(2) Date: Jul. 22, 2014

(87) PCT Pub. No.: WO2013/113457
PCT Pub. Date: Aug. 8, 2013

(65) Prior Publication Data
US 2015/0010730 A1    Jan. 8, 2015

(30) Foreign Application Priority Data

Feb. 3, 2012 (EP) .................... 12153936

(51) Int. Cl.
*E04C 2/28* (2006.01)
*E04C 2/04* (2006.01)
(Continued)

(52) U.S. Cl.
CPC ................ *E04C 2/28* (2013.01); *B32B 5/022* (2013.01); *B32B 5/08* (2013.01); *B32B 5/26* (2013.01);
(Continued)

(58) Field of Classification Search
CPC .. D04H 1/54; D04H 1/56; D04H 1/70; D04H 3/02; D04H 3/14; D04H 1/732;
(Continued)

(56) References Cited

U.S. PATENT DOCUMENTS 3,322,617 A    5/1967  Osborne
3,993,822 A    11/1976 Knauf et al.
(Continued)

FOREIGN PATENT DOCUMENTS

EP    2 230 075    9/2010
JP    2001-293817  10/2001
(Continued)

OTHER PUBLICATIONS

International Search Report for PCT/EP2012/076905, dated Jul. 16, 2013.
(Continued)

*Primary Examiner* — Frank J Vineis
*Assistant Examiner* — Laura B Figg
(74) *Attorney, Agent, or Firm* — Laine IP Oy (57) ABSTRACT

Gypsum board having a core, said core having at least one side covered with a non-woven fabric; characterized in that the inner side of the non-woven fabric, which is in contact with the core of the gypsum board, has a surface roughness Ra of from 25 to 60 micrometers, preferably from 25 to 50 micrometers, advantageously from 25 to 40 micrometers.

24 Claims, 4 Drawing Sheets

(51) Int. Cl.
*B32B 13/14* (2006.01)
*B32B 5/28* (2006.01)
*B32B 5/26* (2006.01)
*B32B 5/02* (2006.01)
*B32B 7/02* (2019.01)
*B32B 5/08* (2006.01)
*D21H 17/00* (2006.01)
*D21H 21/16* (2006.01)
*D21H 27/02* (2006.01)
*D21H 27/38* (2006.01)

(52) U.S. Cl.
CPC ............... *B32B 5/28* (2013.01); *B32B 7/02* (2013.01); *B32B 13/14* (2013.01); *D21H 17/74* (2013.01); *D21H 21/16* (2013.01); *D21H 27/02* (2013.01); *D21H 27/38* (2013.01); *E04C 2/043* (2013.01); *B32B 2250/05* (2013.01); *B32B 2250/40* (2013.01); *B32B 2260/023* (2013.01); *B32B 2260/044* (2013.01); *B32B 2260/046* (2013.01); *B32B 2262/0276* (2013.01); *B32B 2262/062* (2013.01); *B32B 2262/101* (2013.01); *B32B 2262/14* (2013.01); *B32B 2307/538* (2013.01); *B32B 2307/714* (2013.01); *B32B 2307/718* (2013.01); *B32B 2307/7145* (2013.01); *B32B 2607/00* (2013.01); *Y10T 428/24355* (2015.01); *Y10T 428/24612* (2015.01)

(58) Field of Classification Search
CPC ............... Y10T 442/60; Y10T 442/638; Y10T 442/659; Y10T 442/66; Y10T 442/671; Y10T 442/68; Y10T 442/681; D21D 5/04
See application file for complete search history.

(56) References Cited

U.S. PATENT DOCUMENTS

| | | | |
|---|---|---|---|
| 4,047,355 A | 9/1977 | Knorr | |
| 4,647,496 A | 3/1987 | Lehnert et al. | |
| 4,654,052 A * | 3/1987 | Sharp | G01N 30/7293 210/198.2 |
| 4,783,942 A | 11/1988 | Nunley et al. | |
| 5,319,900 A | 6/1994 | Lehnert et al. | |
| 5,552,187 A | 9/1996 | Green et al. | |
| 6,787,486 B1 | 9/2004 | Gregg et al. | |
| 2003/0232182 A1* | 12/2003 | Bruce | B28B 19/0092 428/292.4 |
| 2005/0020170 A1* | 1/2005 | Deka | D04H 1/54 442/327 |
| 2005/0181693 A1* | 8/2005 | Kajander | B32B 5/02 442/172 |
| 2006/0068186 A1* | 3/2006 | Leclercq | B32B 5/022 428/294.7 |
| 2006/0172110 A1 | 8/2006 | Feigin et al. | |
| 2007/0287345 A1 | 12/2007 | Confalone et al. | |
| 2009/0324925 A1 | 12/2009 | Conley et al. | |

FOREIGN PATENT DOCUMENTS

| | | |
|---|---|---|
| JP | 2008-001058 | 1/2008 |
| WO | WO 02/06605 | 1/2002 |
| WO | WO 2004/055286 | 7/2004 |
| WO | WO 2008/027199 | 3/2008 |
| WO | WO 2008/100777 | 8/2008 |

OTHER PUBLICATIONS

"Manufacturing," *Textile Innovation Knowledge Platform*, Textile Centre of Excellence, accessed Oct. 21, 2019, <http://www.tikp.co.uk/knowledge/technology/nonwovens/under-construction/>.

* cited by examiner

GYPSUM BOARD SUITABLE FOR WET OR HUMID AREAS

This application is the U.S. national phase of International Application No. PCT/EP2012/076905, filed 26 Dec. 2012, which designated the U.S. and claims priority to EP Application No. 12153936.5 filed 3 Feb. 2012, the entire contents of each of which are hereby incorporated by reference.

The invention relates to a building material comprising a layer of gypsum plaster core sandwiched between two mats. In particular, the subject matter of the invention is a gypsum board that is suitable especially for being used as building material in a bathroom, a kitchen, a laundry room, basically in any room that may be exposed to humidity, even outdoor.

Gypsum boards, or drywalls or plasterboards, consist of a fibrous mat (typically a cellulosic paperboard, or a nonwoven) wrapped around a thicker layer of gypsum. The gypsum, or plaster, is a hydratable calcium sulfate such as $CaSO_4 \cdot \frac{1}{2}H_2O$ for instance, which is hardened upon wetting and subsequent drying.

Although the core of the gypsum board is mainly constituted of gypsum, its properties can be improved by introducing additives. For instance, the gypsum composition may include water resistant additives such as poly(vinyl alcohol), wax, polysiloxanes, or thermoplastic synthetic resins. Other additives include the fire resistant glass fibers or mineral fillers (clay). Properties of the gypsum board can therefore be tuned according to the intended final use.

Water resistant additives, such as fluorocarbon resin or silicone derivatives, are also introduced into the fibrous mat to bring hydrophobicity to the final gypsum board.

The water resistance of a gypsum board is typically characterized by the maximum allowed absorption of liquid water into the board, in accordance with either of norm ASTM C-473 or EN-520 or EN15 283-1.

Although the introduction of additives within the gypsum and/or the mat can be necessary in order to make sure that the gypsum board can be used in a wet area, it may also dramatically weaken the bonding between the mat and the gypsum. Indeed, hydrophobic additives may prevent a good surface contact and chemical interaction between the fibrous mat and the gypsum core.

As a consequence, one of the main issues in developing gypsum boards for wet areas use, concerns the compatibility between the specific gypsum composition and the mat. Improvement of the bonding between the mat and the gypsum is therefore of high concern.

Prior art examples of wet resistant gypsum board include mats that have been tailored to the gypsum composition. For instance, US 2006/0068186 describes a nonwoven mat comprising two plies of different compositions, an inner ply and an outer ply, where the inner ply is in contact with the gypsum core. The inner ply comprises a mixture of cellulose fibers, inorganic or mineral fibers and optionally organic fibers. On the other hand, the outer ply comprises essentially cellulose fibers. The 2 plies are bonded together with a binder and a mineral filler, in the presence of a fluorocarbon water resistant agent. The inner and outer layers have respectively an inner and outer exterior face, where the inner exterior face comes in contact with the gypsum board. The inner and outer exterior faces are relatively flat as a result of the standard wetlaid nonwoven production process for forming the web. While the boards according to this prior art document are satisfactory, the bonding can still be improved.

EP 2 230 075 relates to a nonwoven mat for wet area gypsum board wherein at least one surface of the nonwoven mat is treated with a hydrophilic binder latex. In this gypsum board the bonding between the gypsum core and the mat is enhanced thanks to improved chemical compatibility.

WO2004/055286 discloses a gypsum panel comprising a gypsum core faced with a fibrous mat. A thin coating of a curable formulation is applied on the fibrous facing sheet of the gypsum panel.

WO2008/100777 discloses a gypsum panel which is covered on at least one face with a fibrous woven or non-woven mat. A finish material is applied on the surface of the mat which is in contact with the gypsum panel. The goal is to decrease the permeability of the fibrous mat facing in order to improve the water resistance of the panel. Even if it is mentioned that the surface of the mat before applying the finish is irregular, it is specified that the finish is applied as a layer which is thick enough to slow or prevent the penetration of the cementitious slurry through the fibrous mat. This means that the irregular surface does not exist after the finish is applied. Furthermore, the document does not give any information regarding the way of manufacturing the mat.

U.S. Pat. No. 6,787,486 discloses a backerboard sheet having moisture resistant face layers secured to an aerated concrete core. In a specific embodiment, moisture resistant face layers include a woven fiber mesh incorporated into a respective resin layer.

In order to address the above mentioned technical problems and despites deficiencies related to the above solutions, the Applicant has developed a new gypsum board that exhibits enhanced bonding properties between the gypsum core and the mat, as compared to prior art plasterboards. This new gypsum board is especially intended to be used in humid conditions, i.e. containing water resistant agents in the core and/or in the mat, Indeed, due to its surface roughness, the mat is more tightly bound to the gypsum, regardless of the gypsum composition and regardless of the presence of any additives, used especially in humid conditions in the mat and/or in the core of the gypsum board.

SUMMARY OF THE INVENTION

The subject matter of the invention relates to a gypsum board having a relatively rough mat. The invention is about improving the bonding of the fabric to the gypsum by modifying the surface structure of the mat. In fact, the mat is preferably a non woven fabric.

The invention is defined in the attached set of claims.

In the following description, the non woven fabric is also designated "non woven mat", "non woven facer", "mat facer" or simply "mat" or "facer". A ply may also be named "web".

More specifically, the subject matter of the invention concerns a gypsum board having a core, said core having at least one surface covered with a non woven fabric. The inner side of the non woven fabric, which is in contact with the core of the gypsum board, has a surface roughness Ra of from 25 to 60 micrometers.

According to a preferred embodiment, the inner side of the non woven fabric, which is in contact with the core of the gypsum board, comprises an embossing pattern having a surface roughness Ra of from 25 to 60 micrometers, advantageously from 25 to 50, preferably 25 to 40.

According to another aspect of the invention, the gypsum board comprises a two plies non woven fabric, where the inner side of it exhibits a surface roughness Ra of from 25 to 50 micrometers, advantageously from 25 to 40, and is preferably having an embossing pattern.

Without wishing to be bound by theory, the Application believes the roughness may arise from the reorientation of the fibers further to the embossing process.

The Ra surface roughness parameter corresponds to the arithmetic mean of the absolute values of ordinates Z(x) within a base length (L) with x varying from 0 to L. This parameter is well known to the skilled man in the art.

In other words, the Ra parameter is obtained as follows:

$$Ra = \frac{1}{L}\int_0^L |Z(x)|dx$$

Therefore, the invention also concerns a non-woven mat having an inner side and an outer side, characterized in that the inner side comprises an embossing pattern having a surface roughness Ra of from 25 to 60 micrometers, preferably from 25 to 50 micrometers, advantageously from 25 to 40.

According to the invention, the specific features of roughness and pattern of the non-woven mat are obtainable by a process comprising wet laying a suspension of fibers onto a screen assembly so as to form a web and draining water from the web to produce the embossing pattern having a surface with the roughness Ra of from 25 to 60 micrometers.

The screen assembly comprises a first base screen and a second screen superimposed thereon.

It is supposed that the use of the double screen assembly does not only form an embossed pattern on the bottom face of the non-woven fabric but also is responsible for a certain reorientation of fibers on the surface of the embossed pattern leading to the specific roughness.

Advantageously, the number of weft and warp yarns/cm of the first base screen is greater than that of the second screen. Preferably, the first base screen contains at least more than 4 times weft and warp yarns/cm than the second screen.

Practically:
The first base screen comprises between 15 and 20 weft yarns/cm, preferably, 32 weft yarns/cm, and between 15 and 20 warp yarns/cm, preferably 32 warp yarns/cm,
The second screen comprises between 1 and 15 weft yarns/cm, preferably, 7 weft yarns/cm, and between 1 and 15 warp yarns/cm, preferably, 6.3 warp yarns/cm,
The ratio of apertures per $cm^2$ between the first and the second screen is at least 10, advantageously equal to 23.2.

According to another characteristic, the diameter of weft and warp yarns of the first base screen is at least less than 4 times the diameter of weft and warp yarns of the second screen.

Advantageously, the diameter of the weft yarns of the first base screen is less than the diameter of the warp yarns of the first base screen.

Practically,
The first base screen comprises weft yarns having a diameter between 0.1 and 0.4, advantageously equal to 0.18 mm, and warp yarns having a diameter between 0.1 and 0.4 advantageously equal to 0.22 mm,
The second screen comprises weft yarns having a diameter between 0.3 and 1.2, advantageously equal to 0.7 mm, and warp yarns having a diameter between 0.3 and 1.2, advantageously equal to 0.75 mm, The non woven facer used in the invention is thus a non-woven that has specific surface properties, preferably with a two-plies structure.

On the other hand, the second side of the non woven fabric, i.e. the outer side has advantageously a surface roughness Ra of less than 25 micrometers. The surface roughness of the outer side Ra is preferably less than 15 micrometers, and even more preferably from 5 to 15 micrometers. The outer side of the non-woven fabric is generally unembossed even if it can be advantageous to propose an embossing pattern.

The outer side is not in contact with the gypsum core. It is in contact with the air and it is meant to be painted or covered with tiles for instance.

Although in some particular cases, this outer side may have a roughness similar to that of the inner side which is in contact with the gypsum core; it has advantageously an inferior surface roughness.

Practically, the applicant has observed that the roughness was higher when the surface of the mat was embossed compared to an unembossed surface. Therefore, the combination of an embossed pattern with a specific roughness on its surface permits to strongly improve the anchoring of the mat on the gypsum panel.

The mat of the gypsum board is a non woven fabric that can be made of fibers or strands, cut or uncut, oriented or not, so as to form a sheet.

A non woven is a material obtained from a random arrangement of individual fibers which are interlaid. They can be held together by adhesives, heat and pressure, or needling for example. Such non woven supports can be prepared according to well known processes such as melt-blowing, spin laying, carding, air laying and water laying.

The term "fiber" means a material form characterized by an extremely high ratio of length to diameter (e.g. 50/1). In the context of the present invention, the suitable fiber length is advantageously from about 0.1 cm to about 4 cm.

According to a particular embodiment, the mat, i.e. the non woven fabric, may be constituted of one or more plies, advantageously two plies. In fact, when the mat comprises at least two plies (inner+outer plies), the side of the inner ply that is in contact with the gypsum core corresponds to the inner side of the mat. It therefore comprises an embossing pattern having a surface roughness Ra of from 25 to 60 micrometers.

Plies of the mat can have identical or different compositions.

The non woven fabric, or any of its plies, preferably comprises fibers that may be selected from the group consisting of:
cellulose based fibers including, wood pulp, cotton fibers, sisal and abaca;
man-made fibers derived from cellulose, including viscose, rayon, and lyocell;
glass;
mineral fibers;
synthetic (polymeric) fibers; and
mixtures thereof.

According to a preferred embodiment, said synthetic (polymeric) fibers include polymer fibers that may be selected from the group consisting of polyamide, polyaramide, polyethylene, polypropylene, polyester, and mixtures thereof. Polyester is the preferred synthetic fiber. Fiber size can vary within broad ranges, for example from 2.0 to 40.0 micrometers in diameter and 1.5 to 38 mm in length. Mixture of different length can be used.

As already mentioned, inner and outer plies of the mat may have different compositions. However, the outer ply is advantageously essentially made of cellulose based fibers so as to provide a gypsum board that can be more conveniently handled since the outer ply does not cause itching or any other unpleasant feeling, in case that inorganic fibers such as e.g. glass fibers have been used in composition of the inner ply.

According to another preferred embodiment, the cellulose based fibers may represent at least 25 wt % of the mat, preferably 30 wt %, more preferably 40 wt % of the non woven fabric.

Preferably the non woven facer comprises two plies, where the outer ply is essentially cellulose and the inner ply comprises, by weight based on the total weight of the fibers, from 25 to 60 wt % of cellulose fibers, from 25 to 60 wt % of glass fibers, and from 0 to 30 wt % of organic fibers, and preferably from 30 to 50 wt % of cellulose fibers, from 30 to 50 wt % of glass fibers, and from 10 to 20 wt % of organic fibers.

The cellulose may be obtained from paper, paperboard, or wood for example.

According to the invention, the non woven fabric having one or two plies, may also comprise at least a binder and/or at least one kind of mineral filler particles. These additives may account for 20 to 50 wt % with respect to the weight of the non woven fabric.

For instance, the individual fibers may be held to each other by a least a binder that may be selected from the group consisting of urea formaldehyde, melamine formaldehyde, polyester, acrylics, polyvinyl acetate, ethylene vinyl acetate copolymers, styrene acrylic copolymers, styrene butadiene styrene copolymers, polyvinyl chloride, etc, and mixtures thereof. Preferably, said binder is a hydrophobic self cross-linkable binder, such as a styrene acrylic copolymer, in order to show good wet strength.

On the other hand, the mineral filler particles may be an organic or inorganic powder selected from the group consisting of calcium carbonate, calcium sulfate, clay, kaolin, sand, talc, mica, glass powder, titanium dioxide, magnesium oxide, alumina, alumina trihydrate, aluminum hydroxide, antimony oxide, silica, silicate, etc. . . . The dimensions of the filler are such that it substantially penetrates into the fibrous mat. For example, the mineral filler could be particles that have a $d_{50}$ from about 0.1 to about 10 micrometers, preferable about 0.5 to 5 micrometers.

The mat may also comprise water resistant or repellent additives such as fluorinated polymers. The amount of fluorinated additive may vary from 0.1 to 5% wt (based on the dry weight of the mat), preferably from about 0.2 to 2% wt.

Fluorinated polymers can be for example emulsions of acrylic copolymers with perfluorinated acrylates.

As already said, the inner side of the mat that is in contact with the gypsum core comprises an embossing pattern having a surface roughness of between 25 and 60 micrometers. It allows to significantly improve the bonding of the gypsum to the mat.

Regarding the additional characteristics of the mat, its overall weight may represent up to 200 g/m$^2$, it is advantageously between 100 and 200 g/m$^2$, preferably 160 g/m$^2$ Furthermore, its porosity may range from between 10 and 60 L/m$^2$/s under 196 Pa. This porosity represents the air flow that can pass through the sample under a certain pressure drop across the mat, accordingly to the paper industry standard TAPPI T251 cm-85.

Additionally, the average thickness of the mat may range from about 0.2 to about 0.5 mm.

On the other hand, according to another embodiment, the gypsum layer may have a thickness of from 10 to 20 mm.

As already said, the properties of the gypsum core can be adjusted with respect to the intended use of the gypsum board. As a result, the gypsum can consist of gypsum or a mixture of gypsum and additives imparting water resistance, or fire resistance properties.

Examples of water resistant additives include poly(vinyl alcohol), molten wax, emulsified wax/asphalt, emulsified wax, asphalt, metallic soaps, resins, polysiloxanes and synthetic thermoplastic synthetic materials such as polyvinylchloride or polyvinylacetate to name a few. The amount of water resistant additives may vary between 0.05 wt % to about 5 wt % in reference of the total weight of the gypsum core.

Examples of fire resistant additives include mineral fibers (glass fibers, basalt fibers), and mineral fillers (clay, vermiculite, silica, alumina). The amount of fire resistant additives can be from about 0.03 wt % to about 10 wt %.

Further additives can be used, such as a biocide, particularly required for wet area gypsum board. Foaming agent is also typically used in the gypsum core slurry in order to decrease the total core weight. Typical gypsum core weight density ranges from 700 to 1000 kg/m$^3$. Thickening or fluidizing additives are also typically used to control the rheology of the gypsum slurry. These could be respectively carboxymethylcellulose (CMC), hydroxymethylcellulose (HMC), hydroxyethylcellulose (HEC), starch, guar gums as thickening agents, and polycarboxylate ether as fluidizing agent. Starch, CMC, HMC or HEC are also used to impart better bonding between the gypsum core and the mat facer.

The invention also relates to a process for the manufacturing of a gypsum board as described above, and its use as construction material especially in wet area such as a bathroom, a kitchen, or a laundry room for instance. Said gypsum board can be used in any wet area, indoor or outdoor.

The manufacturing process of the board of the invention is very simple, since it can be carried out on a conventional wall board line. Especially, compared to previously known techniques, there is no need to specifically control the viscosity of the plaster slurry, since the plies usually exhibit a blocked porosity with the filler such that the gypsum will not substantially penetrate into the mat-facer.

Briefly, the process for manufacturing a gypsum board comprises the following steps:
(i) preparation of a plaster slurry by mixing the various constituents of the composition with water in a mixer;
(ii) deposition of the slurry thus prepared on at least one mat-facer of the invention, on the inner ply of this mat,
(iii) shaping and covering of the upper face of the slurry using a second reinforcing material, preferably a second mat-facer of the invention, onto its inner ply;
(iv) where appropriate, shaping of the edges of the board obtained previously by molding the fresh plaster on profiled bands, this shaping comprising especially feathering the edges of the board;
(v) hydraulic setting of the hydratable calcium sulfate on a manufacturing line while the ribbon of hydratable calcium sulfate board runs along a conveyor belt;
(vi) cutting of the ribbon at the end of the line into predetermined lengths; and
(vii) drying of the boards obtained.

Between steps (ii) and (iii), one can have a sub-step (iia) which comprises the step of folding the mat-facer of the invention in a U shape for the formation of the edges. One advantage of the present mat-facer of the invention is the easiness of the folding.

This process for making a gypsum board may further include, just prior to the drying step, a step comprising covering with a second non woven fabric (mat) the side of the gypsum that is not already covered with the first non woven fabric.

The non-woven fabric is manufactured according to the wet laid process disclosed before.

In more details, the process for making the non woven typically comprises:
- wet laying a suspension of fibers onto a screen assembly so as to form a web,
- draining water from the web to produce the embossing pattern having a surface with the roughness Ra of from 25 to 60 micrometers,
- drying the web having said embossing pattern,
- optionally impregnating the web with a solution containing at least a binder and
- drying the impregnated web.

The impregnation step is advantageously made in a size press.

Filler particles may be added to the size composition. By regulating the viscosity and/or the particle size distribution of the particles, the penetration into the web(s) can be adjusted.

The second mat, when it is present, can also have an inner side comprising an embossing pattern and having a roughness Ra of from 25 to 60 micrometers, said inner side being in contact with the gypsum.

The first and second mats may overlap as the first mat may be wrapped around the gypsum core. This is a well known technique within the manufacturing industry of gypsum board.

The inner sides of the first and second non woven fabrics may also comprise the same embossing pattern having the same surface roughness Ra of from 25 to 60 micrometers.

According to a preferred embodiment of the invention, the first and second non woven fabrics have the same chemical composition.

Furthermore, the gypsum slurry is such that it can also penetrate the mat. It will typically not go through it entirely. Without wishing to be bound by theory, Applicant believes that the gypsum slurry penetrates the "valleys" of the rough side (inner side) of the mat, and may possibly also penetrate (partially) into the mat.

However, the outer side of the mat, i.e. the side that does not face the gypsum core, is essentially gypsum free, and advantageously entirely gypsum free.

According to a particular embodiment, the mat is a non woven having two plies, wherein the gypsum slurry may penetrate the first ply, while the second ply is essentially gypsum free.

In that case, the process of manufacturing the mat may comprise:
- wet laying a first suspension of fibers onto a screen assembly so as to form a web,
- then wet laying a second suspension on the top side of the web and simultaneously draining water from the web to produce, on the bottom side of the web, the embossing pattern having a surface with the roughness Ra of from 25 to 60 micrometers,
- drying the web,
- optionally impregnating the web with a solution containing at least a binder,
- drying the impregnated web.

The impregnation step is advantageously made in a size press.

Such process involves advantageously the use of the screen assembly as previously disclosed.

The invention also relates to the non woven fabric to be used in the manufacturing of a gypsum board as described above. More specifically, it concerns a non woven fabric which has an inner side comprising an embossing pattern having a surface roughness Ra of from 25 to 60 micrometers for the manufacturing of a gypsum board having a core, said core having at least one side covered with the non woven fabric, the inner side of the non woven fabric being in contact with the core.

Such a non woven fabric may be prepared as disclosed above. A further disclosure of the process can be found in U.S. Pat. No. 3,322,617.

According to a preferred embodiment, the gypsum board contains water resistant agents in the core and/or in the non woven fabric.

Additionally, the outer side of the non woven fabric, which is in contact with the air, can have a surface roughness Ra less than 25 micrometers. The surface roughness Ra of the outer side is preferably less than 15 micrometers, and even more preferably between 5 and 15 micrometers. The outer side may comprise an embossing pattern or not.

As already said, the non woven fabric may have more than one ply i.e. it can be a single or multilayer fabric. It is preferably a two ply fabric, where the outer side of the non woven fabric, which is in contact with the air, comprises essentially cellulose based fibers and has a surface roughness Ra less than 15 micrometers, and advantageously between 5 and 15 micrometers. Advantageously, the outer side of the non woven fabric is unembossed.

By "essentially cellulose based fibers", we mean a content of at least 90 wt % of cellulose with respect to the weight of the fibers comprised in the non woven fabric, and regardless of the weight of further additives such as a binder and/or a filler.

According to another embodiment, the non woven fabric is a two ply fabric, where the outer side of the non woven fabric, which is in contact with the air, consists of cellulose based fibers and has a surface roughness Ra less than 15 micrometers and advantageously between 5 and 15 micrometers.

Use of this non woven fabric for the manufacturing of a gypsum board suitable for wet areas is another aspect of the invention.

The board can be used in a variety of applications, both indoors and outdoors.

As an example of an indoor application, one may mention shaft wall assemblies, tile backing as well as partitions and ceilings in wet area rooms.

A gypsum board as described herein can be used to particular advantage as a component of a partition or shaft wall assembly or similar assembly in the interior of a building. In such application, the mat-faced board can be used with particular advantage in place of conventional paper-faced gypsum core board or shaft liner panels, the core of which may include fire-resistant additives. Assemblies of this type generally comprise metal or wood framework or studs for support of the gypsum panels which form the partitions in bathrooms and other wet or humid areas, the walls of the shafts of elevators, stairwells and the like. Mat-facer gypsum board, as described herein, can be used, for example, as the shaft liner panel. For use in such application, the core of the board can include fire resistant additives.

One may refer to U.S. Pat. No. 4,047,355, incorporated herein by reference, for details on a shaft wall assembly. The instant board can also be used with advantage in aeraulic ducts, in a manner similar to WO-A-02/06605.

The instant board can also be used with advantage as a tile backing in bathrooms.

The usual construction of bathroom walls includes a ceramic tiles adhered to an underlying base member, for example, a panel of gypsum board of the invention. Such a panel is referred to in the industry as a "tile backing board," or "tile backer". In usual fashion, sheets of tile backer are fastened by rust-resistant nails or screws to studs. The board joints and screw heads are then treated in a conventional manner with a water-resistant compound before the surface is finished, for example, by paint or ceramic tiles. Wall-to-wall and floor-to-wall joints may be treated additionally with conventional sealants or corking compounds before the surface is finished.

Pieces of ceramic tiles are adhered to the sheets of tile backer by water-resistant adhesive (e.g. "mastic") or by a Portland cement-based adhesive (e.g. "setting mortar"), the latter case being mostly for floor applications. Thereafter, spaces between the tiles and between the tiles and other adjoining surfaces are filled with a water-resistant material (the "grouting").

The instant boards will also be useful in any application for partitions and ceilings in wet area rooms. Also, the boards of the invention can be used in any application for which wall boards are known to be useful, including drywall.

As outdoor applications, one may mention especially, roof deck system and EIS (Exterior Insulating System) and EFS (Exterior Finishing System), which latter systems will be disclosed in more details below.

A typical roof deck system incorporating the gypsum boards of the invention is as follows. In this construction, spaced parallel trusses extending between building support members support usually a (corrugated) metal deck which is fastened to the trusses. Layers of insulating sheet material (e.g. expanded polystyrene) are disposed on the corrugated metal deck. A gypsum board of the invention is secured to the corrugated deck by means of fasteners. The joints of the boards are sealed in a conventional way by application of tape. Overlying the gypsum board is a waterproof roofing membrane. Typically this membrane comprises alternate layers of asphalt and roofing felt. A final coating of asphalt may be covered with a topping layer.

One may refer to U.S. Pat. No. 4,783,942, incorporated herein by reference, for details on a roof deck system. Exterior Insulating Systems and Exterior Finishing systems. An EIS system typically comprises insulating material which is sandwiched between an underlying support surface and an exterior finishing material which can be an integral part of the insulating material, but which is usually applied to the insulating material at the site of installation. From one EIS system to the next, there exist variations in structural details and components. For example, although the exterior finishing material may be affixed directly to the insulating material, various systems include a reinforcing component sandwiched between the exterior finishing material and the insulating material. The reinforcing component comprises generally one or more plies of fiber glass reinforcing fabric or mesh which is adhered by suitable mastic to the surface of the insulating material. In some systems, the support surface is affixed to a wooden frame attached to the exterior surface of the outside wall of a building, whereas in other systems a metal frame is used. In certain applications, the support surface may be affixed directly to the exterior surface of an outside wall, for example, one comprising cinder blocks or concrete blocks. The adhesive or mastic for adhering together components of the system tends to vary from one system to the next, and are known. They typically comprise specially formulated proprietary compositions. Mechanically fastened insulation is also suitable. The improved support surface of the present invention can be used satisfactorily and to good advantage in EIS systems which include overlying plies of insulating and exterior finishing materials, and other optional components. The insulating material is generally substantially free of channels penetrating therethrough.

One useful insulating material in EIS systems is expanded or foamed polystyrene, a material which has good moisture resistant properties. Although it has desirably low water vapor transmission, it is not a vapor barrier, but instead is capable of breathing. Rigid panels of expanded polystyrene are used most widely in EIS systems. Such panels have satisfactory compressive strength and resilience and are presently available in varying thicknesses and lengths. Other thermal insulating materials can be used in EIS systems also. Examples of such materials include extruded polystyrene, polyurethane, polyisocyanurate, cement-based insulating plasters, and phenolic foam. Insulating materials generally have low thermal conductivity and low density. As mentioned above, various EIS systems include a reinforcing component, for example, in cloth form, sandwiched between the insulating material and the exterior finishing material. Glass cloth can be used in a conventional manner to reinforce the system, that is, to improve the impact strength of the system. The particular type or types of glass cloth used and the number of plies thereof which are used depend on the impact resistance which is desired. Examples of reinforcing cloth or fabric which can be used in the system are woven glass, glass fiber scrim and glass fiber mesh. A coating can be applied on the reinforcing cloth or fabric to protect from alkali attack in the adhesive. Installation of the reinforcing fabric generally involves applying a suitable adhesive to the surface of the insulating material and then applying the fabric thereto. Additional plies of fabric can be applied if desired. A cement/acrylic resin is an example of an adhesive that can be used. The exterior finishing material can be affixed directly to the insulating material or to an intermediate surface such as, for example, the surface of a reinforcing member as described above. The exterior finishing material has weathering characteristics and is preferably appealing in appearance. Generally, an exterior finish that can be used is a conventional dry product that is mixed with water and then which is spread or troweled on the underlying substrate. Alternatively, one may use an acrylic resin-based composition which is available in a paste-type form. After application, the resin sets to form a tough, weather-resistant solid material which adheres tightly to the underlying substrate. Such resin compositions are available commercially in a variety of colors. They usually include aggregate which can vary in size. This allows the applicator to choose a particular composition which permits him to apply a finish that can vary in texture from fine to coarse. Examples of other materials that can be used as an exterior finish are Portland cement including, for example, sand and larger aggregate.

The exterior finish can vary in thickness over a wide range, as is known in the art, with a coating or layer thickness of about 2 to 6 mm being exemplary.

Different systems may have a different number of layers applied in the system. One typical example is the following in commercial applications: steel studs, building wrap (like Tyvek®), gypsum board, trowel on adhesive, EPS insulation, trowel on Portland cement-based adhesive, glass scrim reinforcement, "brown" support coat of Portland cement-based adhesive, and finally a color coat of Portland cement based mortar or a coat of paint.

The gypsum board of the present invention can be used also to good advantage in place of conventional gypsum sheathing in applications other than EIS systems, i.e. these systems having no insulating material. Thus, the board can be used as an underlying support surface which is covered with overlying finishing materials, for example, aluminum, wood siding, plaster and Portland cement.

Numerous advantages flow from the use of the present invention. An EIS system which includes a mat-facer gypsum support surface that has affixed thereto insulating material by adhesive only, that is, without fastening means which extend through the insulating material, has higher tensile or cohesive strength than a like system which includes conventional paper-faced gypsum board. The mat-facer of the gypsum support member is water resistant. This improved water resistance gives the applicator greater flexibility in selecting adhesives that can be used to adhere insulation directly to the mat-faced surface of the gypsum support element as adverse affects are not encountered by the use of water-based adhesives. The mat-facer of the gypsum support element is "nailable", and accordingly, it can be secured readily to an underlying frame or other substrate by nailing. The improved support surface of the present invention has improved rigidity and strength uniformity in both the length and width dimensions of the system. The preferred embodiment of the invention which includes the use of a water-resistant core provides a substantially improved weather-resistant product which better resists degradation both within and outside of the system. One may refer to U.S. Pat. Nos. 4,647,496, 5,319,900 and 5,552,187, all incorporated herein by reference, for details on Exterior Insulating Systems and Exterior Finishing systems The invention offers a further advantage. It is known that the stucco that is used for the manufacture of gypsum boards has different qualities depending on the sourcing and origin of the stucco. It may be natural or it may be FGD, for example. Hence, there is a need for a facer that would eliminate any consequence of the variation between different stuccos and afford high level properties, irrespective of the type of stucco. The invention affords such a facer, which is effective with both fine and coarse stuccos. Without wishing to be bound by theory, the Applicants believe that the roughness of the facer is such that it allows entanglement, at least partial (for example 70%) of stucco particles within the fibers of the facer (inner face/inner ply).

The following figures and examples illustrate the invention without limiting its scope.

EXAMPLES

1) Nonwoven Mats

Two mats F1 and F2 (non woven fabrics) have been manufactured on an industrial papermaking line.

Each mat comprises two plies (inner+outer).

The inner ply comprises, in wt % based on the total weight of the fibers:
- 45% of cellulose fibers (length of about 2.5 to 5 mm, diameter of about 30 micrometers),
- 14% of polyester fibers (length of about 3 to 12 mm and diameter of about 12 to 13 micrometers), and
- 41% of glass fibers (length of about 6 to 12 mm and diameter of about 23 micrometers).

The dry surface weight of the inner ply is about 73 $g/m^2$.

On the other hand, the outer ply comprises 100% cellulose fibers (length of about 2.5 to 5 mm, diameter of about 15 to 30 micrometers)

The dry surface weight of the outer ply is about 26 $g/m^2$.

Both inner and outer plies are impregnated with a mixture comprising (in parts per weight of the impregnation mixture):
- 67 parts of a binder (self cross-linkable styrene acrylic polymer dispersion),
- 0.6 parts of a fungicide (iodine based organic dispersion)
- 1.5 part of a fluorocarbon water repellent (perfluoroacrylate copolymer dispersion) and
- optionally 27 parts of a filler.

The dry added weight due to the impregnation mixture is about 38 $g/m^2$ when the mixture does not comprise any filler. However, it is about 56 $g/m^2$ when the mixture does comprise a filler.

The filler can either be calcium sulphate anhydrite or kaolin (the median particle diameter is such that $D_{50}$ is from about 1 to about 5 micrometers).

F1 is manufactured by a common wet-laid process.

According to this process, mats are manufactured on an industrial papermaking line comprising a primary head box and a secondary head box wherein first and second dispersions of fibers are respectively prepared corresponding respectively to inner ply and outer ply of the mat. The first dispersion of fibers is wet laid on a screen comprising 32 warp yarns/cm having a diameter equal to 0.18 mm and 32 weft yarns/cm having a diameter equal to 0.22 mm, so as to form a web. Then the second suspension is wet layed on the top side of the web. The process consists in simultaneously draining water from the web to produce, on the bottom side of the web, the embossing pattern having a surface with the specific roughness. The web is then dried and impregnated by using a size press with the above mentioned mixture. The facer is finally dried.

F2 differs from F1 in that a screen assembly comprising a first base screen and a second screen superimposed thereon is used instead of a single screen.

In this embodiment:
- The first base screen comprises 32 weft yarns/cm and 32 warp yarns/cm,
- The second screen comprises 7 weft yarns/cm and 6.3 warp yarns/cm,
- The ratio of apertures per $cm^2$ between the first and the second screen is equal to 23.2, The first base screen comprises weft yarns having a diameter equal to 0.18 mm, and warp yarns having a diameter equal to 0.22 mm, The second screen comprises weft yarns having a diameter equal to 0.7 mm, and warp yarns having a diameter equal to 0.75 mm.

Two different mats, F1 and F2, have therefore been prepared. They have different inner and outer surface roughness as shown in table 1 below.

2) Surface Roughness Measurement

As described above, the F1 and F2 mats comprise an inner ply and an outer ply, as well as an inner side and an outer side. These two sides are characterized by their inner surface roughness (inner side in contact with the gypsum core) and their outer surface roughness (outer side that is not in contact with the gypsum core).

The surface roughness can be characterized by the roughness parameter Ra, which is the arithmetic mean of the absolute values of ordinates (x) along a fixed length (L) (FIG. 1) which defines the roughness profile. The Ra parameter is determined from at least 6 different roughness profiles within the working image, and correspond to the average of these at least 6 single Ra values. This Ra parameter is commonly used by the skilled man in the art in order to determinate the surface roughness of a substrate, especially in the paper and nonwoven industry, but also in other kind of materials industry (plastic, metals, etc).

Figure 1:
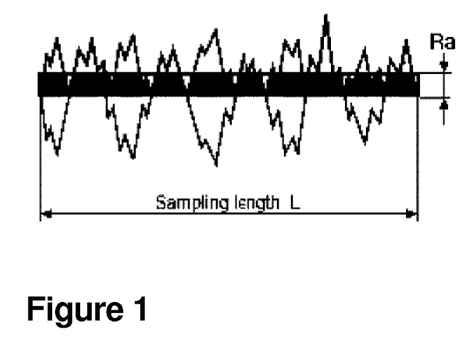
FIG. 1 shows the Ra parameter vs the sample length of a rough surface.

The Ra parameter is obtained as follows (FIG. 1):

$$\left.\begin{array}{c} Ra \\ Pa \\ Wa \end{array}\right\} \text{Arithmetical mean deviation}$$

Arithmetical mean of the absolute ordinate values Z(x) within a sampling length $$Ra, Pa, Wa = \frac{1}{L}\int_0^L |Z(x)|dx$$

Figure 2:
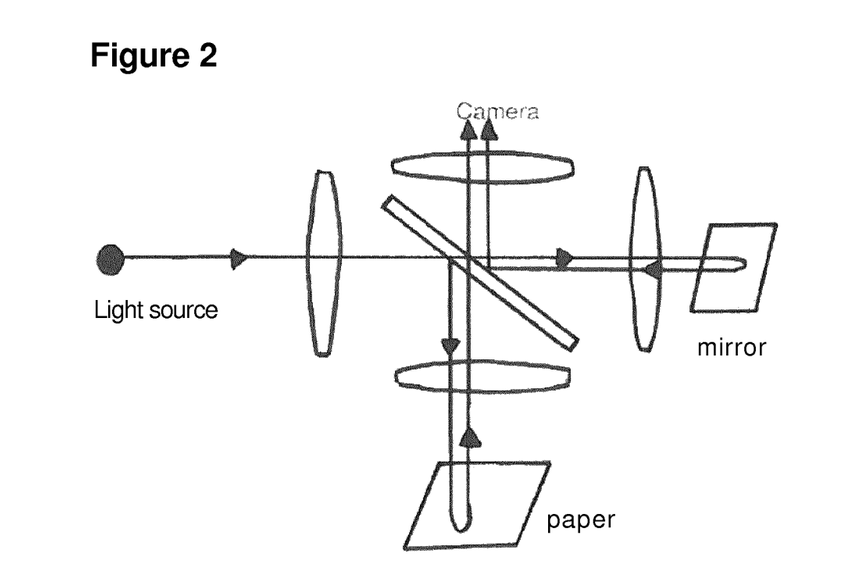
FIG. 2 is a schematic view of a method allowing the measurement the Ra parameter of a rough surface.

Roughness profiles of the mats were obtained through an optical measurement method based on enhanced white light vertical scanning interferometry. The principle of this optical based measurement method is the following (FIG. 2): A vertical scan white light interferometric microscopy tool is leading to the surface topography through a white light interferometry of 2 light beams. The first beam is reflected by a perfect flat mirror which forms the reference surface and the second is reflected by the sample which has a certain topography. The 2 beams interfere and form a figure consisting of alternate dark and bright fringes: the interferogram pattern. When the distances travelled by light from the sample surface and that of the mirror are identical, the light intensity on the detector is maximum. The two waves are then said to be in phase or at zerochromatic order. Conversely, when the 2 distances are becoming different, intensity oscillates for a short time and then decrease very quickly. The principle involves shifting the reference mirror and locating the greatest intensity during scanning.

Experimental data have been collected on the TOPO3D instrument at the CTP (Centre Technique du Papier, Grenoble, France).

The analyzed area of the mat corresponds to 3.5 mm by 3.5 mm.

The Ra values of the F1 and F2 mats are listed in table 1.

TABLE 1

Figure 3:
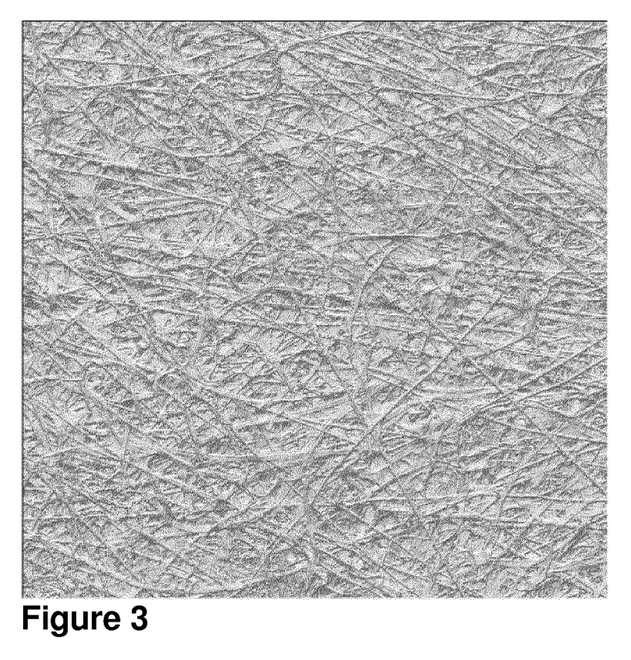
FIG. 3 is a photo of the inner ply surface of the F1 nonwoven mat.
Figure 4:
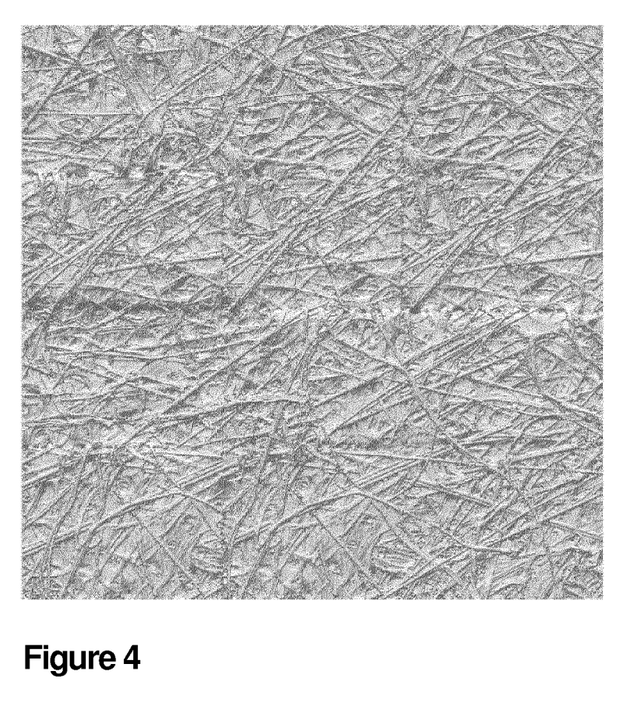
FIG. 4 is a photo of the inner ply surface of the F2 nonwoven mat.
Figure 5:
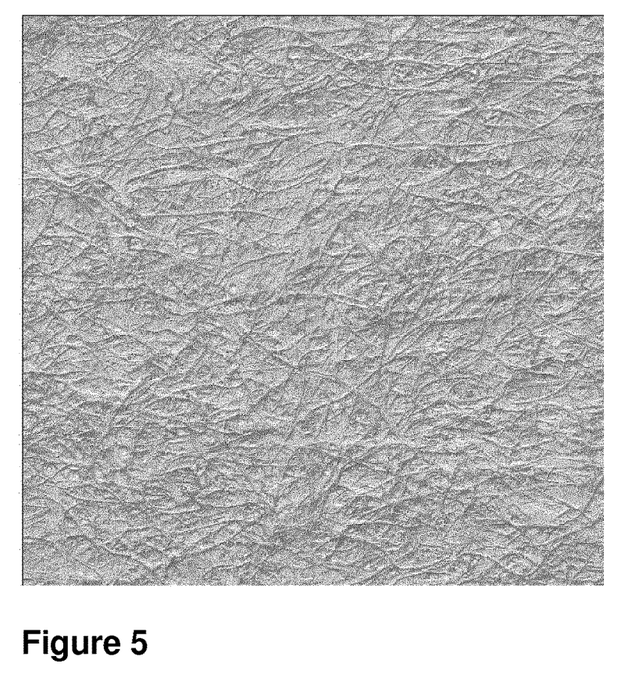
FIG. 5 is a photo of the outer ply surface of the F1 nonwoven mat.
Figure 6:
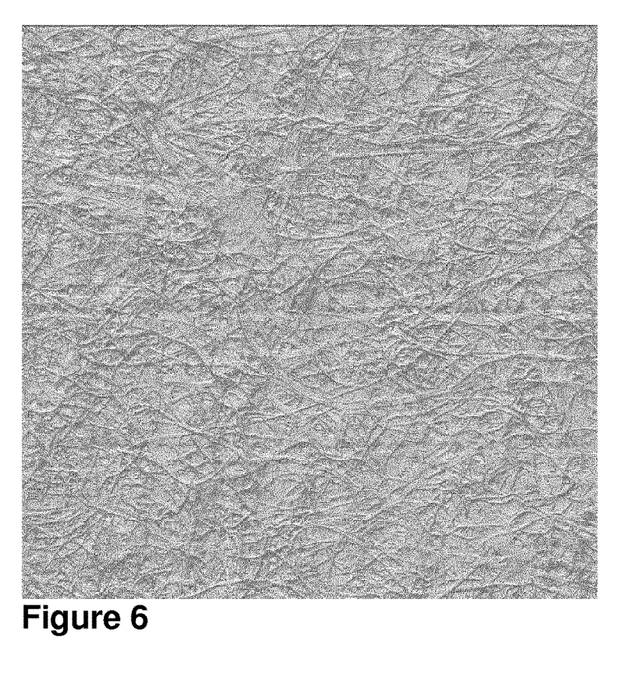
FIG. 6 is a photo of the outer ply surface of the F2 nonwoven mat.

| surface roughness of the F1 and F2 mats | | |
|---|---|---|
| Ra value (micrometers) | F1 mat | F2 mat |
| Inner surface | 19.4 (FIG. 3) | 27.2 (FIG. 4) |
| Outer surface | 9.8 (FIG. 5) | 10.5 (FIG. 6) |

FIGS. 3-6 clearly show the roughness differences between the inner ply of the F1 and F2 mats. The roughness of the outer ply is similar since the second dispersion of fibers is applied in the same conditions on the inner ply of both F1 and F2. Applicant assume that the difference of roughness of the inner ply is due to the use of a double screen which not only confers a specific embossing pattern to the surface but also rearrange the fibers on the surface of the pattern.

3) Joint Tape: Preparation of Minibands

Minibands have been prepared in a laboratory at 20° C.+/−3° C., and a relative humidity over 40%.

Strips (50 mm wide and 297 mm long) of each nonwoven F1 and F2 mats are cut with a razor knife along the machine direction.

A standard plasterboard (cellulose based cardboard) of 150 mm wide by 350 mm long is used as substrate for preparing the joint tape. Such suitable plasterboard includes PREGYPLAC BA13 available from LAFARGE Then, a 80 mm wide and 1 mm thick layer of joint compound is applied onto the plasterboard. This 1 mm thick layer is prepared with a blade and two 1 mm thick gauges.

The mat strip is then laid down in the middle of the joint compound, the inner side of the mat being in contact with the joint compound. Going over the mat with the blade (on its 2 gauges) allows ensuring total and homogeneous contact between the mat and the joint compound.

The resulting minibands are allowed to dry for 7 days into a 25° C. climate room with a relative humidity of 50%.

The minibands are then directly tested (dry bonding strength), or conditioned (humid bonding test).

As shown in table 2, two different joint compounds have been used.

TABLE 2

| C1 and C2 joint compound compositions | | |
|---|---|---|
| | Joint compound | |
| | C1 | C2 |
| Commercial name | Enduit WAB | Enduit J1L |
| Supplier | LAFARGE | SALSI |
| Type | Ready to use | Powder |
| Density | 1.6 to 1.65 | 1.47 to 1.63 |
| pH | 8 to 9 | 6 to 8 |
| Brookfield viscosity (cps) | 400 000 to 500 000 | 400 000 to 500 000 |
| Solid/Liquid ratio | NA | 2.2 |

4) Boards: Preparation of Miniboards

Miniboards have been prepared in a laboratory at 20° C.+/−3° C. and a relative humidity over 40%.

Strips (126 mm wide 176 mm long) of the nonwoven F1 and F2 mats are cut with a razor knife in the machine direction.

The four edges of the inner side of the strips are then creased in order to obtain four sharp fold lines, 13 mm inside the strip.

The four fold lines are therefore 100 mm apart along the cross direction, and 150 mm along the machine direction.

The four corners of the fold lines are then stapled in order to give an open mould shape to the strip, the inner side of the strip facing the inside the mould.

In the meantime, the gypsum core mixture is prepared as follows.

The appropriate amount of water is poured into a plastic beaker, so as to get a fixed solid/liquid ratio of 1.67.

Then, all the liquid additives are added in the beaker, and the mixture is homogenized under slight stirring.

The hydratable calcium sulphate is then added into the beaker.

The resulting slurry is allowed to rest for 2 minutes, and then the mixture is homogenized under mechanical mixing for 5 minutes at 200 rpm.

After 5 min of stirring, the slurry is poured into the moulded nonwoven mat as described above.

Excess of gypsum slurry is removed from the exceeded 13 mm height in order to leave a flat surface.

The miniboard is then allowed to set at ambient conditions for 53 hours.

Thereafter, the miniboard is dried at 70° C. in a ventilated oven for 6 hours.

The resulting miniboard is then conditioned at 25° C. and 50% relative humidity for 24 hours before measuring the dry bonding strength.

The different gypsum core compositions that have been tested are listed in Table 3.

TABLE 3

B1-B3 gypsum core compositions

| | Core compositions | | |
|---|---|---|---|
| | B1 | B2 | B3 |
| Hemi-hydrate[a] | 100% | 99% | 98.13% |
| Starch[b] | — | 1% | 1% |
| Silicone[c] | — | — | 0.87% |

[a]$CaSO_4 \cdot 1/2H_2O$
[b]RediFILM 5400 from National Starch
[c]Methylhydrogenopolysiloxane, MH1107 Fluid from Dow Corning 5) Bonding Tests This test consists in measuring the peeling strength necessary so as to delaminate from the gypsum core or the joint compound, a 50 mm wide strip of the nonwoven mat (nonwoven F1 or F2 in these examples). Furthermore, in order to ensure accuracy of the test, the peeling strength is measured at the steady speed of 100 mm/min, and perpendicularly to the surface.

In the case of the miniboards, the 50 mm strip of nonwoven mat (nonwoven F1 or F2 in these examples) is cut along the machine direction, from the backside of the miniboard.

In the case of miniboards, 5 to 10 mm of the nonwoven 50 mm strip is removed manually from the core at one of the two strip extremities. This free "tab" is then clamped in the upper jaws of a dynamometer. In the case of minibands, a 5 to 10 mm of nonwoven strip extremity is clamped in the upper jaws of a dynamometer in a similar way.

The miniboard is then secured on a horizontal plate that can move horizontally at the same linear speed than the crosshead (100 mm/min).

The peeling force is recorded by the dynamometer as a function of the crosshead position.

The bonding strength represents the average of 3 measurements. It is expressed in grams.

For the dry bonding test: prior to the testing, the samples have been conditioned for 24 hours into a climate room with a relative humidity of 50% and 25° C. The dry bonding test is carried out right after this 24 hour period.

For the humid bonding test, prior to the testing, the samples have been conditioned for 24 hours into a climate room with a relative humidity adjusted to 90% and temperature of 30° C. The humid bonding test is carried out right after this 24 hour period.

In addition to measuring the peeling force, the weight of the strip is weighted after being peeled off the gypsum board. It therefore allows comparing initial and final weights so as to calculate the overall weight difference. This typically corresponds to the amount of gypsum core or joint compound that is removed by the nonwoven mat.

6 Bonding Strength Results

Joint Tape: Minibands

TABLE 4

Bonding of the minibands to the joint compound

| | Joint compound | | | |
|---|---|---|---|---|
| | C1 | | C2 | |
| | Nonwoven facer | | | |
| | F1 | F2 | F1 | F2 |
| Dry bonding (g) | 541 | 826 | 199 | 383 |
| Humid bonding (g) | 504 | 819 | 150 | 277 |
| Weight uptake (g/m$^2$) (dry) | +3 | +6 | +3 | +17 |

The dry and humid bonding strengths between the joint tape and the gypsum core is significantly improved when the F2 mat is used, regardless of the C1 or C2 joint compound.

Additionally, without the willingness to be bind with theory, the weight uptake, in the case of the non woven facer F2, might be explained by the higher surface roughness. This certainly leads to a greater penetration of the joint compound within the fibrous structure.

Miniboards

TABLE 5

Bonding of the F1 and F2 non woven fabric to the gypsum core

| | Core composition | | | | | |
|---|---|---|---|---|---|---|
| | B1 | | B2 | | B3 | |
| Nonwoven facer | F1 | F2 | F1 | F2 | F1 | F2 |
| Drybonding (g) | 20 | 275 | 480 | 714 | 214 | 408 |
| Weight uptake (g/m$^2$) (dry) | 11 | 31 | 0 | 11 | 3 | 13 |

Regardless of the gypsum core composition of the example, the bonding with the nonwoven mat having a greater surface roughness (F2) is greater than with the nonwoven mat having a lower roughness.

This trend is also confirmed when we look at the amount of gypsum that is removed by the nonwoven strip (weight uptake in the table). The nonwoven mat F2 (with the higher surface roughness) pull out a higher weight of gypsum per square meter, which may be due to a higher interpenetration of the gypsum slurry/core into the fibrous surface layer of the nonwoven.

Plasterboards.

The following plasterboards are manufactured.

The line that is used for the manufacture is a standard line. The composition of the slurry of the core is a standard formulation for wet area boards and is the same composition as the composition of the core of the boards marketed by company SINIAT for the commercial product PREGYWAB, which is according to US 2006/0068186. The facer that is used for the manufacture of the plasterboards is facer F2.

The boards thus obtained have been subjected to the following tests.

Binding

Figure 7:
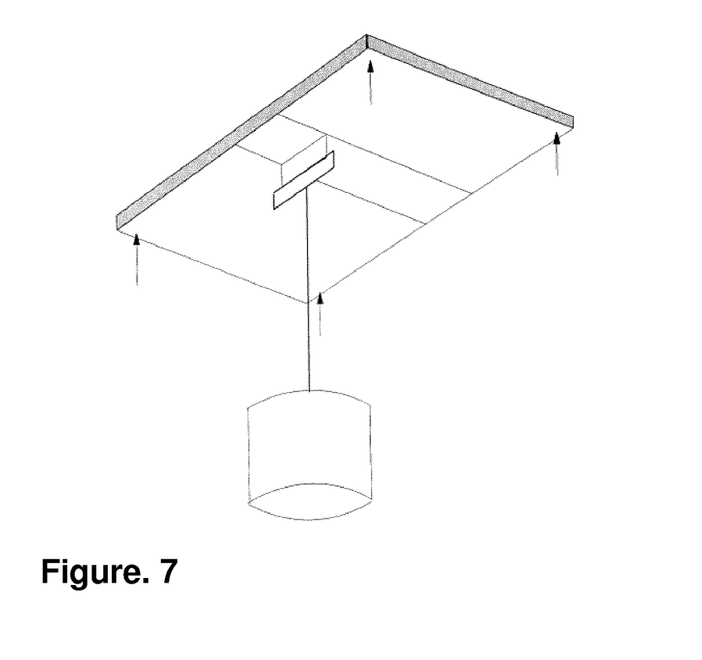
FIGS. 7 and 8 represent schematically the equipment and the procedure of the peeling test.

The peeling test aims at measuring the load necessary to pull off the liners from the core over 50 mm length The equipment comprises the following, the general description being given in FIG. 7:

Grip+bucket+glass balls (Ø2 mm)+feeding system for glass balls with automatic stop at failure or trial end.

Support for the sample

Scale accurate to 0.1 g

Climate room: 23° C. 50% RH and 30° C. 90% RH

Cutter

The procedure is the following:

Cut 6 specimens 300×300 mm (12×12 in) across the sampled board as shown on drawing (far from any edge): 3 for ambient peeling test (23° C. 50% RH) and 3 for humid peeling (24 hours at 30° C. 90% RH)

2 Modes of Conditioning are Used:

Ambient mode: 24 hours at 23° C. 50% RH or by default in lab room at 23° C. if no humidity control Humid conditions: 24 hours in ventilated humid cabinet at 30° C. 90% RH. In order to achieve a consistent moistening of the board, the number of specimens is limited: for instance: maximum of 30 specimens placed on trays in a 190 L cabinet.

Figure 8:
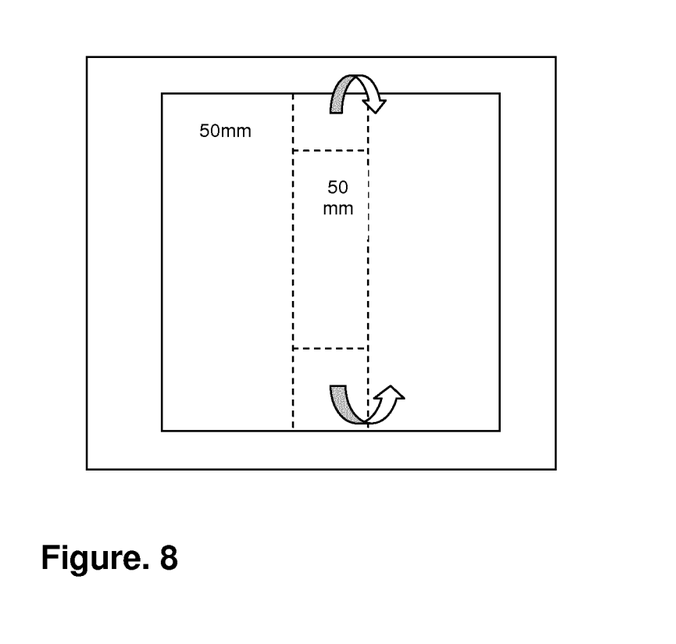

The installment procedure is the following (see the FIG. 8):

In the central part of the board and along the machine direction, trace 2 parallel lines at 50 mm centres. Cut the liner along these lines. Peel off a liner strip of 50 mm wide on a 50 mm distance, and at the 2 ends of the specimen.

Using a cutter, initiate the facer peeling cautiously over the 50 mm (2 in)

Put the sample on the support, face to be tested downward

Clip the grip and the bucket on the strip and make sure the clip and bucket are perfectly centred and aligned.

Start to fill in the bucket with the balls until getting a delamination over 50 mm (2 in). The load rate should be about 1 kg/min. The feeding system is automatically stopped when the liner tears, peels off, or delaminate over 50 mm.

Record the total weight: grip+bucket+glass beads, and the mode of failure

Repeat the test on the other end of the specimen, then return the specimen and carry out 2 other tests on the opposite side The humid peeling procedure is the following:

Weigh the specimen before and after conditioning in order to determine the moisture regain Remove the specimens one by one from the humid chamber and test them immediately. Alternatively, remove them three by three, but place them in a closed plastic bag just after weighing.

Cut the liner along the 2 lines and initiate the peeling after weighing the specimen Start peeling test on face side first, than on back side. The testing time of each side should be less than 4 minutes for each side in order to avoid superficial drying The results are expressed as follows:

For ambient and humid conditioning:

Record the load necessary to remove the facer along 50 mm (2 in) on each specimen Calculate the mean value for the board (on the basis of 6 measurements)

Note the mode of failure: loss of bonding core-facer, or decohesion in the facer, or tearing of the facer, and mention the test conditions for each result (dry or wet conditions)

If not measurable because bonding too high, indicate it.

For humid peeling

Record the moisture regain after 24 hours conditioning

The Cobb 2H and the immersion tests are according to the standard EN520; said standard is followed unless specified otherwise.

The following results have been obtained on two industrial runs. The value given is the result of averaging 8 different measures. For the peeling, results are so good that most specimen are not measurable (delamination at start).

| Run | Weight | Immersion 2H | Cobb 2H (face/back) | Peeling ambient face | Peeling ambient back | Peeling humid face | Peeling humid back |
|---|---|---|---|---|---|---|---|
| 1 | 10.98 | 2.12 | 67/62 | 2652 | 2606 | 1853 | 1848 |
| 2 | 10.89 | 2.37 | 73/63 | 2404 | 2618 | 1870 | 1903 |

Compared to existing boards, especially the boards manufactured according to US 2006/0068186, the boards of the invention exhibit a marked improvement in bonding.

A further test is carried out with a core composition (facer F2 not changed) that differs as far as the stucco is concerned. In the runs 1 and 2, the stucco has the following PSD: PSD (wt) after splitting in water, the d10 is from 1 to 2 μm, the d50 is from 10 to 20 μm and the d90 is from 35 to 50 μm. 100% of the particles fit into pores less than 60 μm and about 90% or more of stucco particles fit into pores less than 40 μm.

In run 3, the stucco has the following PSD:

PSD (wt) after splitting in water, the d10 is from 1 to 2 μm, the d50 is from 20 to 35 μm and the d90 is from 50 to 85 μm. About 90% or less of the particles fit into pores less than 60 μm and about 70% of stucco particles fit into pores less than 40 μm The results are below. Again for the peeling, results are so good that most specimen are not measurable (delamination at start).

| Run | Peeling ambient Face/back | Peeling humid Face/back |
|---|---|---|
| 3 | 2000-2500 | 1700-2100 |

Thus, the change of the supply of stucco has little influence of the result for the peeling, which is advantageous for industrial production.

The invention claimed is:

1. Gypsum board comprising:
a gypsum core, and
a wet-laid nonwoven fabric covering at least one side of the gypsum core, wherein
the nonwoven fabric has an inner side having a surface roughness Ra of from 25 to 60 micrometers which is in contact with the gypsum core, and wherein
the nonwoven fabric has a double screen embossed pattern which includes the surface roughness on the inner side of the nonwoven fabric and fibers on a surface of the embossed pattern.

2. The gypsum board according to claim 1, wherein at least one of the gypsum core and the nonwoven fabric comprises water resistant agents.

3. The gypsum board according to claim 1, wherein the nonwoven fabric comprises fibers selected from the group consisting of cellulose fibers, inorganic fibers, mineral fibers, synthetic polymeric fibers, and mixtures thereof.

4. The gypsum board according to claim 3, wherein the nonwoven fabric comprises at least 25 wt %, based on the weight of the nonwoven fabric, of cellulose fibers.

5. The gypsum board according to claim 3, wherein the nonwoven fabric comprises glass fibers.

6. The gypsum board according to claim 3, wherein the nonwoven fabric comprises synthetic polymeric fibers formed of a polymer selected from the group consisting of polyamide, polyaramide, polyethylene, polypropylene, polyester, and mixtures thereof.

7. The gypsum board according to claim 1, wherein the nonwoven fabric has an outer side which is in contact with air, and wherein the outer side of the nonwoven fabric has a surface roughness Ra less than 25 micrometers.

8. The gypsum board according to claim 1, wherein the nonwoven fabric comprises at least one binder and/or at least one kind of mineral filler particles.

9. The gypsum board according to claim 8, wherein the mineral filler particles have a $d_{50}$ from about 0.1 to about 10 μm.

10. The gypsum board according to claim 8, wherein the at least one binder and the at least one kind of mineral filler particles are present in a weight ratio binder:filler from about 1:2 to about 8:1.

11. The gypsum board according to claim 1, wherein the nonwoven fabric comprises at least two plies.

12. The gypsum board according to claim 11, wherein the nonwoven fabric includes an outer ply which consists essentially of cellulose based fibers, and has a surface roughness Ra less than 25 micrometers.

13. The gypsum board according to claim 11, wherein the nonwoven fabric comprises at least an inner ply and an outer ply, and wherein the inner ply is in contact with the gypsum core and comprises a mixture of cellulose fibers, inorganic fibers or mineral fibers and optionally organic fibers, and wherein the outer ply comprises cellulose fibers, and wherein
the nonwoven fabric further comprises at least a binder and mineral filler particles, the mineral filler particles being distributed at least partially into at least one of the inner ply and the outer ply of the nonwoven fabric.

14. The gypsum board according to claim 13, wherein the inner ply comprises, based on total weight of fibers, from 25 to 60 wt % of cellulose fibers, from 25 to 60 wt % of glass fibers, and from 0 to 30 wt % of organic fibers.

15. The gypsum board according to claim 13, wherein said particles are distributed at least partially into both the inner ply and the outer ply.

16. The gypsum board according to claim 15, wherein the fibers and/or particles in the outer ply of the nonwoven fabric amount to about 0.5-20% by weight of the fibers in the inner ply of the nonwoven fabric, and wherein the fibers and/or particles in the outer ply of the nonwoven fabric are sufficiently large such that more than 90% of the particles and/or fibers are larger than openings between the fibers in the inner ply.

17. The gypsum board according to claim 11, wherein the inner ply and the outer ply are bonded with the same resinous binder.

18. The gypsum board according to claim 11, wherein at least one of the inner ply and the outer ply is bonded with a self cross-linkable binder and/or hydrophobic binder.

19. The gypsum board according to claim 11, wherein at least one of the inner ply and the outer ply further comprises a water-resistant agent.

20. The gypsum board according to claim 11, wherein based on final weight of the nonwoven fabric, the inner ply represents from about 30 to about 150 g/m$^2$, the outer ply represents from about 10 to about 70 g/m$^2$, and the binder and filler together represent from about 20 to about 150 g/m$^2$.

21. The gypsum board according to claim 1, wherein the gypsum core comprises a water-resistant additive in an amount sufficient such that the gypsum core absorbs less than about 10% water when tested in accordance with ASTM method C-473 and/or in accordance with EN 520 method section 5.9.2.

22. The gypsum board according to claim 1, wherein the gypsum core comprises a fire-resistant additive in an amount sufficient such that the board achieves an ASTM E-119 and/or C36-95 fire rating of at least about one hour.

23. The gypsum board according to claim 1, wherein the gypsum core comprises gypsum having a particle size distribution by weight such that, after splitting in water, the gypsum has a $d_{10}$ is from 1 to 2 μm, a $d_{50}$ from 10 to 35 μm and a $d_{90}$ from 35 to 85 μm.

24. The gypsum board according to claim 1, wherein the gypsum core comprises gypsum particles having a particle size distribution by weight such that 100% of the gypsum particles fit into openings of the nonwoven fabric which are less than 60 μm, and about 90% or more of the gypsum particles fit into openings of the nonwoven fabric which are less than 40 μm.

* * * * *